(12) United States Patent
Tsukuda (10) Patent No.: US 6,223,025 B1
(45) Date of Patent: Apr. 24, 2001

(54) RADIO SELECTIVE-CALLING RECEIVER WITH STABLE OPERATION OF CONTROLLER AT LOW VOLTAGES

(75) Inventor: Naoki Tsukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/181,385

(22) Filed: Oct. 28, 1998

(30) Foreign Application Priority Data

Oct. 29, 1997 (JP) .................................................... 9-314506

(51) Int. Cl.$^7$ ....................................................... H04B 1/16
(52) U.S. Cl. ......................... 455/343; 455/38.3; 455/572
(58) Field of Search .................. 455/38.3, 343, 455/572

(56) References Cited

U.S. PATENT DOCUMENTS

| | | | |
|---|---|---|---|
| 5,420,576 | * 5/1995 | Matai et al. ..................... | 340/825.44 |
| 5,525,974 | * 6/1996 | Metai ............................. | 340/825.44 |
| 5,530,911 | * 6/1996 | Lerner et al. .................... | 455/38.3 |
| 5,606,740 | * 2/1997 | Niratsuka et al. ............... | 455/343 |
| 5,649,314 | * 7/1997 | Yamada et al. .................. | 455/343 |
| 5,649,315 | * 7/1997 | Eaton .............................. | 455/343 |
| 5,963,255 | * 10/1999 | Anderson et al. ............... | 348/372 |
| 5,991,635 | * 11/1999 | Dent et al. ...................... | 455/517 |

FOREIGN PATENT DOCUMENTS 6-053883    2/1994 (JP) .

* cited by examiner

Primary Examiner—Curtis Kuntz
Assistant Examiner—Barry W. Taylor
(74) Attorney, Agent, or Firm—Scully, Scott, Murphy & Presser

(57) ABSTRACT

A radio selective-calling receiver which is capable of supplying sufficient power to a controller to provide stable operation of the controller. The operation/non-operation of a DC/DC converter is controlled by a battery saving operation timing control signal BS outputted from the controller to decide the operation timing of a radio section. At the time when the radio section does not operate, the power supplied from a primary battery is converted from DC to DC at a DC/DC converter and is supplied to the controller and also charges a secondary battery. With this structure, the sufficient power supply to the controller by the secondary battery is obtained. The output voltage of the secondary battery is detected and at the time when the output voltage of the secondary battery detected becomes below a fixed voltage value, the interruption from an operating section to the controller is interdicted. Therefore, even at the case that the consumption current of the controller is increased by the operation input of a user, by interdicting the interruption, the controller is able to keep the output voltage of the secondary battery at a fixed voltage value being operational and stable, and the stable operation of the controller is obtained.

6 Claims, 9 Drawing Sheets

FIG. 9

RADIO SELECTIVE-CALLING RECEIVER WITH STABLE OPERATION OF CONTROLLER AT LOW VOLTAGES

BACKGROUND OF THE INVENTION

The present invention relates to a radio selective-calling receiver which in particular maintains stable operation with a sufficient power supply.

Description of the Related Art

Generally, a conventional radio selective-calling receiver operates with one dry battery and has an intermittent operation in order to extend battery life, and only at the time when the data corresponding to the ID of a receiver owner are received, a radio section is switched on and the data are taken in. However, a controller of the radio section always operates to control the operation timing of the radio section. To operate the controller, at least about 2 volt is needed in the current available CPU and so forth, and to supply the voltage, for example a step-up transformer type DC/DC converter as shown in FIG. 1 is used.

Figure 1:
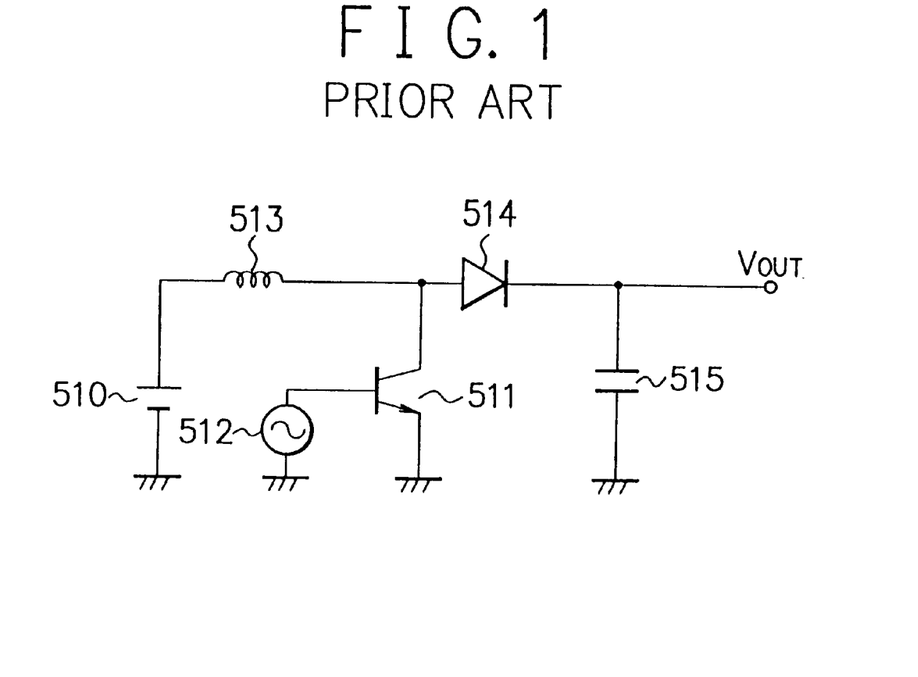
FIG. 1 is a circuit diagram showing the construction of a DC/DC converter for step-up voltage of the conventional radio selective-calling receiver.

In FIG. 1, a transistor 511 is switched on or off by an oscillator 512 and at the "on" state of the transistor 511, the energy supplied from a battery 510 is stored in a coil 513 and when the transistor 511 is turned "off", the energy is supplied to a capacitor 515 via a diode 514. With these operations, at the both terminals of the capacitor 515, the step-upped output voltage Vout is generated.

Figure 2:
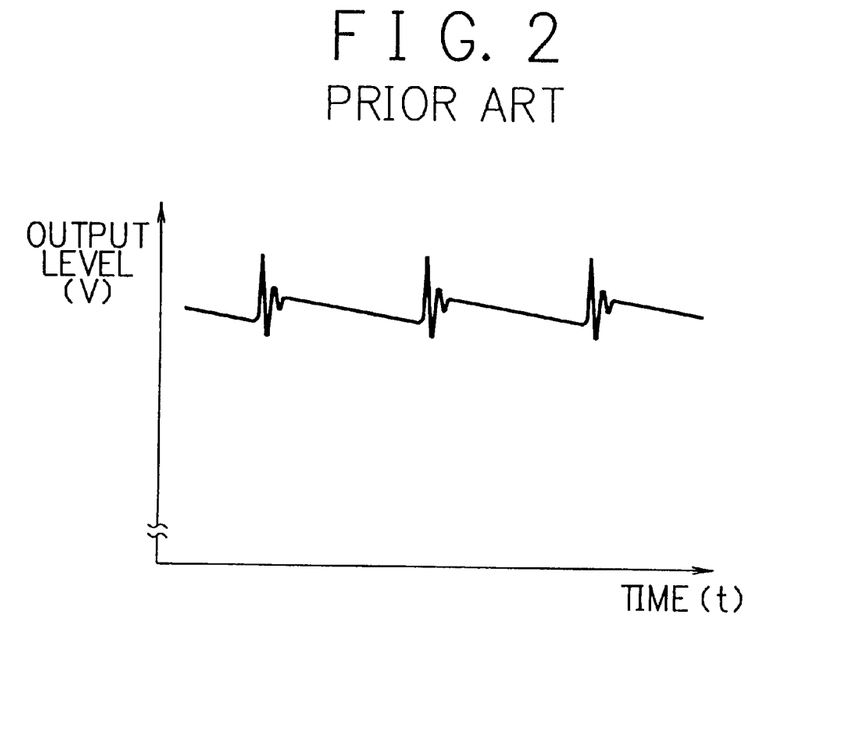
FIG. 2 is a wave form diagram showing switching noise on an output wave form by switching operation of the DC/DC converter for step-up voltage of the conventional radio selective-calling receiver.

In this case, by the switching operation of the transistor 511, the switching noise as shown in FIG. 2 is included in an output wave form and the higher harmonic waves of this switching noise is radiated and has a bad influence on the characteristics of the reception sensitivity and so forth.

Figure 3:
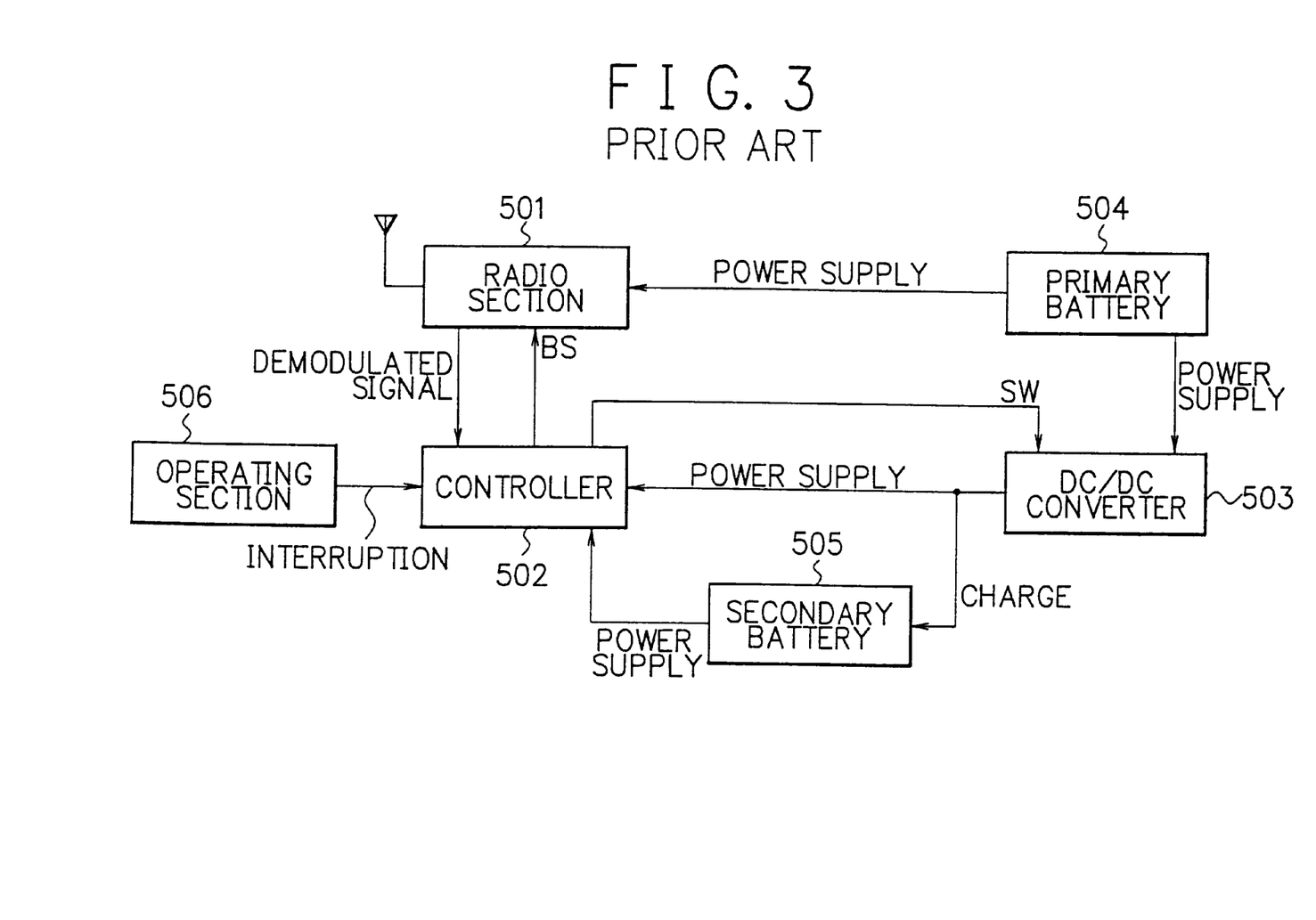
FIG. 3 is a block diagram of the conventional radio selective-calling receiver.

For example, the Japanese Patent Laid-Open Publication No. HEI 6-53883 discloses the radio selective-calling receiver which eliminates of the bad influence of the switching noise of DC/DC converter as shown in FIG. 3.

FIG. 3 is a block diagram showing the construction of the conventional radio selective-calling receiver. In FIG. 3, the radio selective-calling receiver provides a radio section 501 demodulating received signals, a controller 502 which controls intermittently the operation of the radio section 501 and decodes the demodulated signals from the radio section 501 and outputs the signals controlling on/off of a DC/DC converter 503, a primary battery 504 supplying power to the radio section 501 and a secondary battery 505 supplying power to the controller 502. The DC/DC converter 503 is switched on at right before switching on the radio section 501 and converts the power of the primary battery 504 from DC to DC and charges the secondary battery 505 and supplies the power to the controller 502. An operating section 506 implements the interruption to the controller 502 by the operation of a user.

Next, the operation is explained. The radio section 501 amplifies and demodulates the received signals and supplies the demodulated signals to the controller 502. The controller 502 decodes the demodulated signals and also controls the radio section 501 and the on/off controlling of the DC/DC converter 503, and the DC/DC converter 503 is switched on at right before switching on the radio section 501 and charges the secondary battery 505 and supplies the power to the controller 502. At the time of "off" of the DC/DC converter 503, the secondary battery 505 supplies the power to the controller 502. The primary battery 504 supplies the power to the radio section 501 and the DC/DC converter 503. As mentioned above, the power supply to the controller 502 is implemented by the secondary battery 505 and the charge of the secondary battery 505 is implemented by the DC/DC converter 503 at right before switching on the radio section 501, therefore the bad influence of the switching noise of the DC/DC converter 503 is possible to be eliminated.

Figure 4:
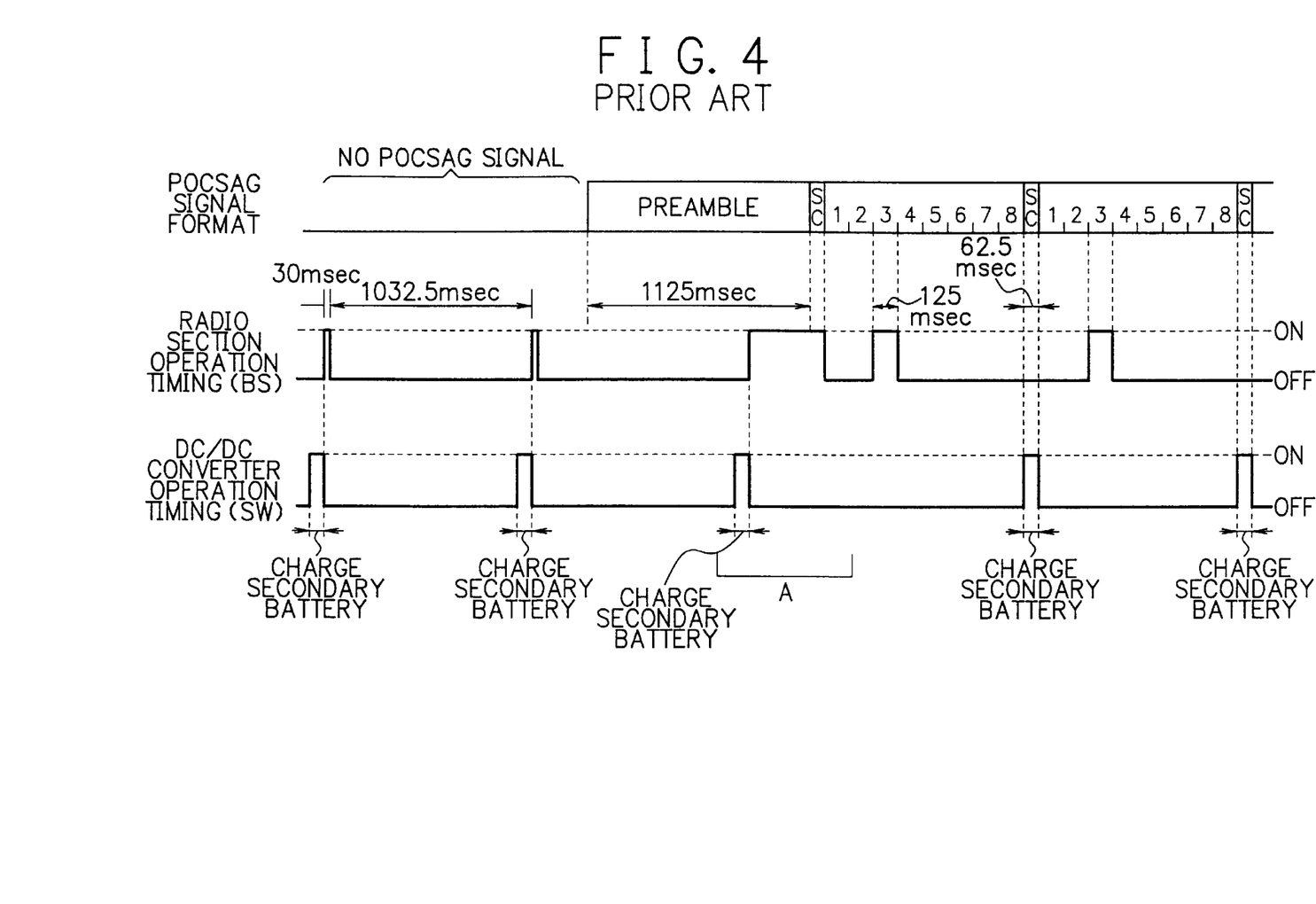
FIG. 4 is a timing chart showing the operation of a radio section and a DC/DC converter of the conventional radio selective-calling receiver using POCSAG format.
Figure 5:
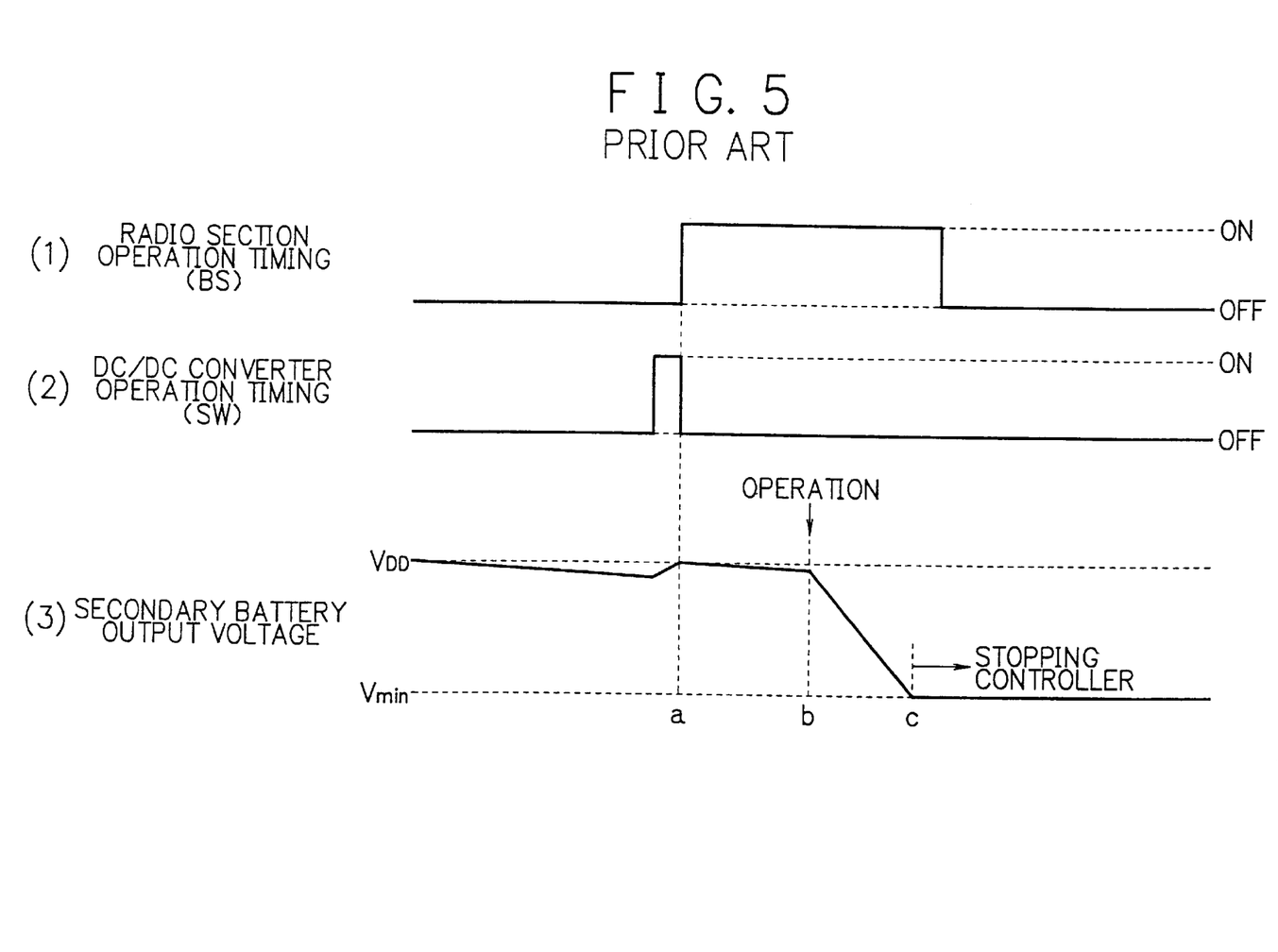
FIG. 5 is a timing chart showing the output voltage change of a secondary battery at the time of interruption from an operating section of the conventional radio selective-calling receiver.

FIG. 4 is a timing chart showing the operation of the radio section 501 and the DC/DC converter 503 of the conventional radio selective-calling receiver using POCSAG (Post Office Code Standardization Advisory group) format. FIG. 5 is a timing chart showing expanded the "A" part of the timing chart of FIG. 4, this shows the change of the output voltage of the secondary battery 505. As shown in FIG. 4, the operation timing of the DC/DC converter 503 is completely different from the operation timing of the radio section 501, as shown in FIG. 5 (2), the DC/DC converter 503 is switched on for a short period at right before switching on the radio section 501 and implements the charge of the secondary battery 505 and the power supply to the controller 502, and at the time of "off" of the DC/DC converter 503, the secondary battery 505 supplies the power to the controller 502 with this charged energy.

The conventional radio selective-calling receiver has the construction stated above. As shown in FIG. 5 (3), at a point "a" the DC/DC converter 503 is switched off and the radio section 501 is switched on and the output voltage of the secondary battery 505 is gradually decreased by the consumption current of the controller 502. This corresponds to the voltage change showing between points "a" and "b" in FIG. 5 (3). Until again switching on the DC/DC converter 503, if the consumption current of the controller 502 does not change, the gradually decreasing output voltage of the secondary battery 505 does not become below the minimum operating voltage Vmin of the controller 502. However, at the case that a user operates the receiver at the point "b", by the rapid increase of the consumption current of the controller 502, the output voltage of the secondary battery 505 decreases greatly and becomes below the minimum operating voltage Vmin of the controller 502 at a point "c", the problem stopping the operation of the controller 502 occurs.

The operation timing of the DC/DC converter 503 is completely different from the operation timing of the radio section 501, therefore there is a problem that a control signal SW only for the DC/DC converter 503 is needed to be provided.

Moreover, because of the charging time of the secondary battery 505 is short, there is a problem that the restoring time of the terminal voltage of the secondary battery 505 to a sufficient voltage driving the controller 502 takes long.

SUMMARY OF THE INVENTION

It is therefore an object of the present invention to provide a radio selective-calling receiver which is capable of supplying a sufficient power to operate a controller and is possible to maintain stable operation of the controller.

To solve the above mentioned problems, the present invention provides a radio section which receives radio signals from the outside by the intermittent operation and demodulates the radio signals, a primary battery supplying the power to said radio section, a controller which decodes said demodulated signals at said radio section and also generates operation timing control signals to make said radio section operate intermittently and outputs said signals to said radio section, a secondary battery supplying the power to said controller, a DC/DC converter which is controlled to the operation/non-operation control by said operation timing control signals from said controller and converts the power of said primary battery from DC to DC and supplies said power to said controller and said secondary battery at the time of the non-operation of said radio section, and an operating section implementing interruption to said controller based on operation input signals.

At the time when the radio section does not operate, the DC/DC converter is switched on by the operation timing control signals from the controller and the power of the primary battery is converted from DC to DC, this DC/DC converted power is supplied to the controller and the secondary battery is charged. With this operation, for the longer non-operation period than the operation period of the radio section, the charge to the secondary battery is able to be implemented and the sufficient energy is able to be stored in the secondary battery and the sufficient power supply to the controller by the secondary battery at the time when the DC/DC converter does not operate is obtained.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the drawings, description will be given in detail of embodiments of the radio selective-calling receiver of the present invention.

Figure 6:
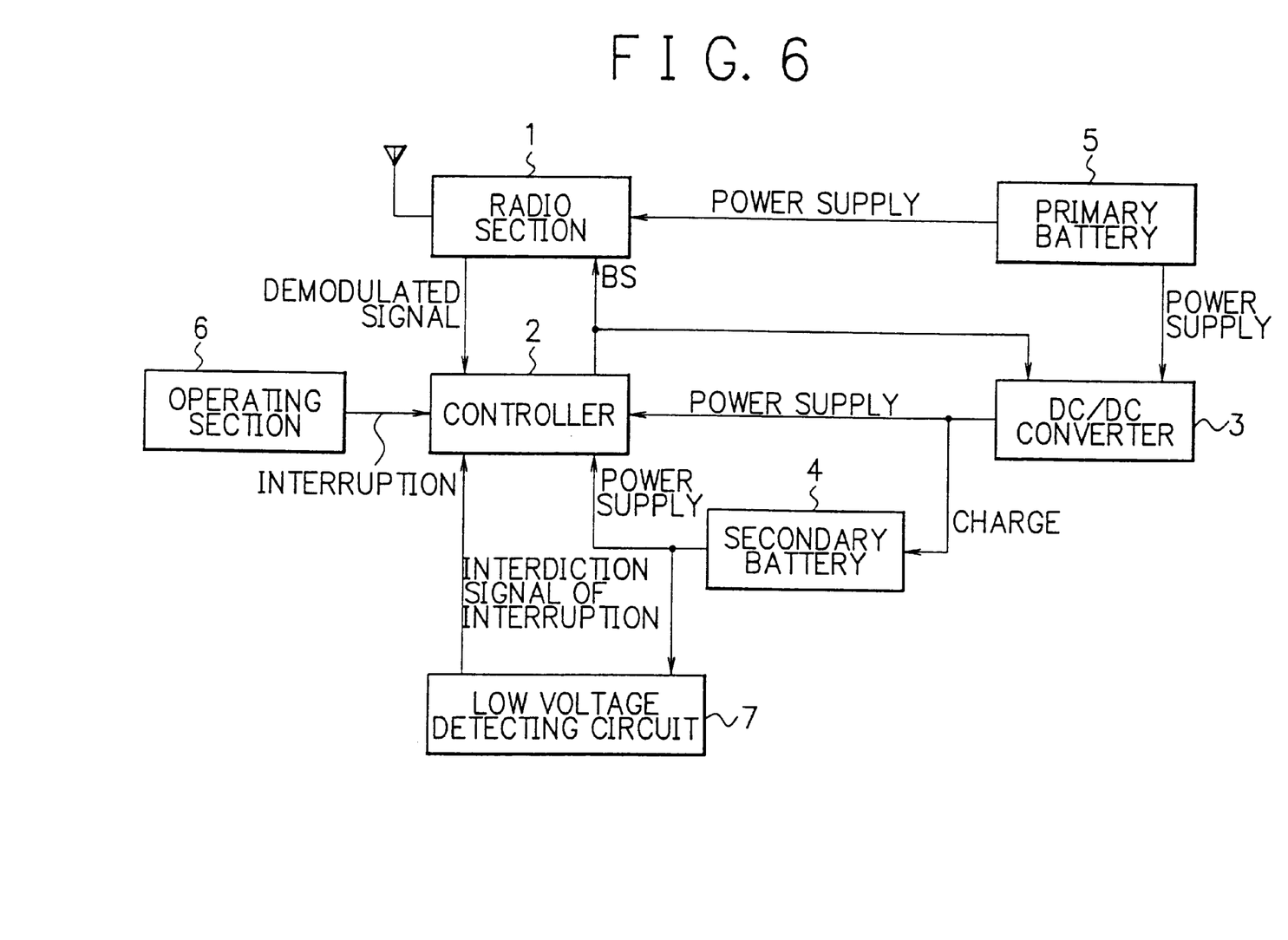
FIG. 6 is a block diagram of an embodiment of the radio selective-calling receiver of the present invention.

FIG. 6 is a block diagram showing an embodiment of the present invention. In FIG. 6, the radio selective-calling receiver is constituted of a radio section 1, a controller 2, a DC/DC converter 3, a secondary battery 4, a primary battery 5, an operating section 6, a low voltage detecting circuit 7 and so forth. The radio section 1 receives radio signals from the outside by operating intermittently and demodulates and amplifies them. The controller 2 decodes the demodulated signals by the radio section 1 and also generates a battery saving operation timing control signal BS which makes the radio section 1 operate intermittently and outputs the signal to the radio section 1. The DC/DC converter 3 is controlled to the operation/non-operation by the battery saving operation timing control signal BS from the controller 2, at the time of non-operation of the radio section 1, also converts the power supplied from the primary battery 5 from DC to DC and supplies the power to the controller 2 and the secondary battery 4. The charged power of the secondary battery 4 is supplied to the controller 2 and the low voltage detecting circuit 7 and further the power of the primary battery 5 is supplied to the radio section 1. The operating section 6 implements the interruption to the controller 2 when a user implements the operation, for example at the time when a user switches on to read a message. The low voltage detecting circuit 7 always watches the output voltage of the secondary battery 4 and at the time when the detected voltage of the secondary battery 4 becomes below a fixed voltage Vt, outputs the interdiction signal of interruption for interdicting or preventing the interruption from the operating section 6 to the controller 2.

Figure 7:
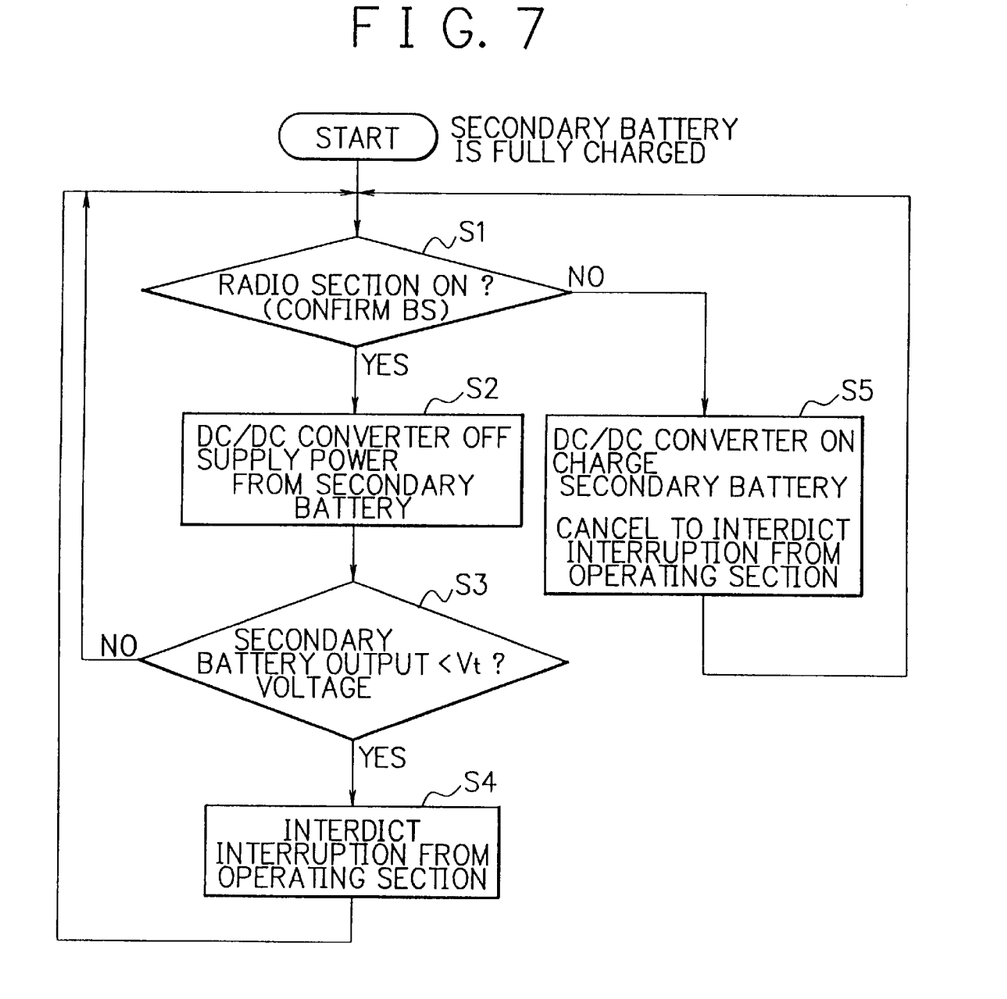
FIG. 7 is a flow chart showing the operation of a controller and a low voltage detecting circuit of an embodiment of the radio selective-calling receiver of the present invention.
Figure 8:
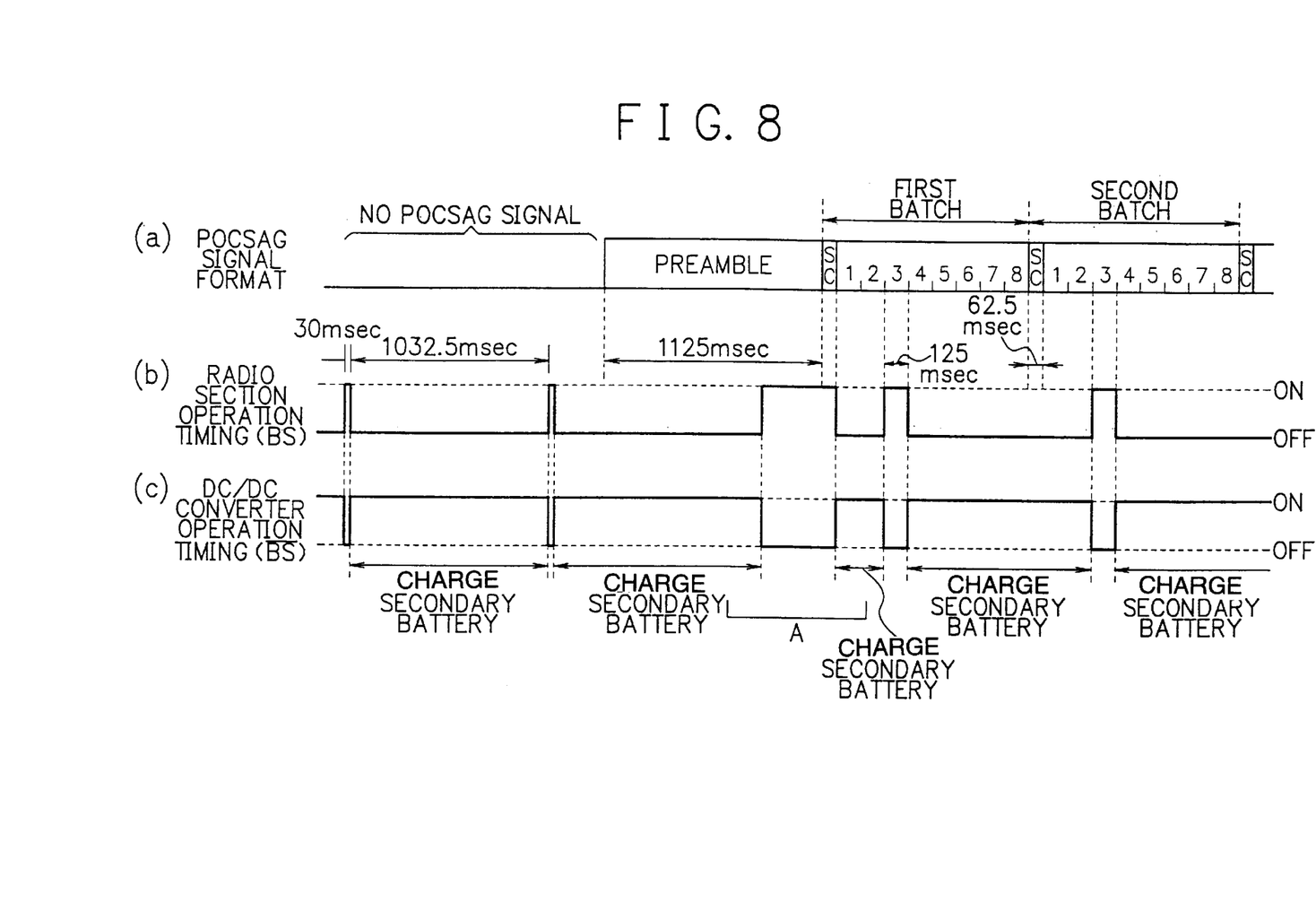
FIG. 8 is the POCSAG signal format and a timing chart showing the operation timing of a radio section and a DC/DC converter for this POCSAG signal format of an embodiment of the present invention.
Figure 9:
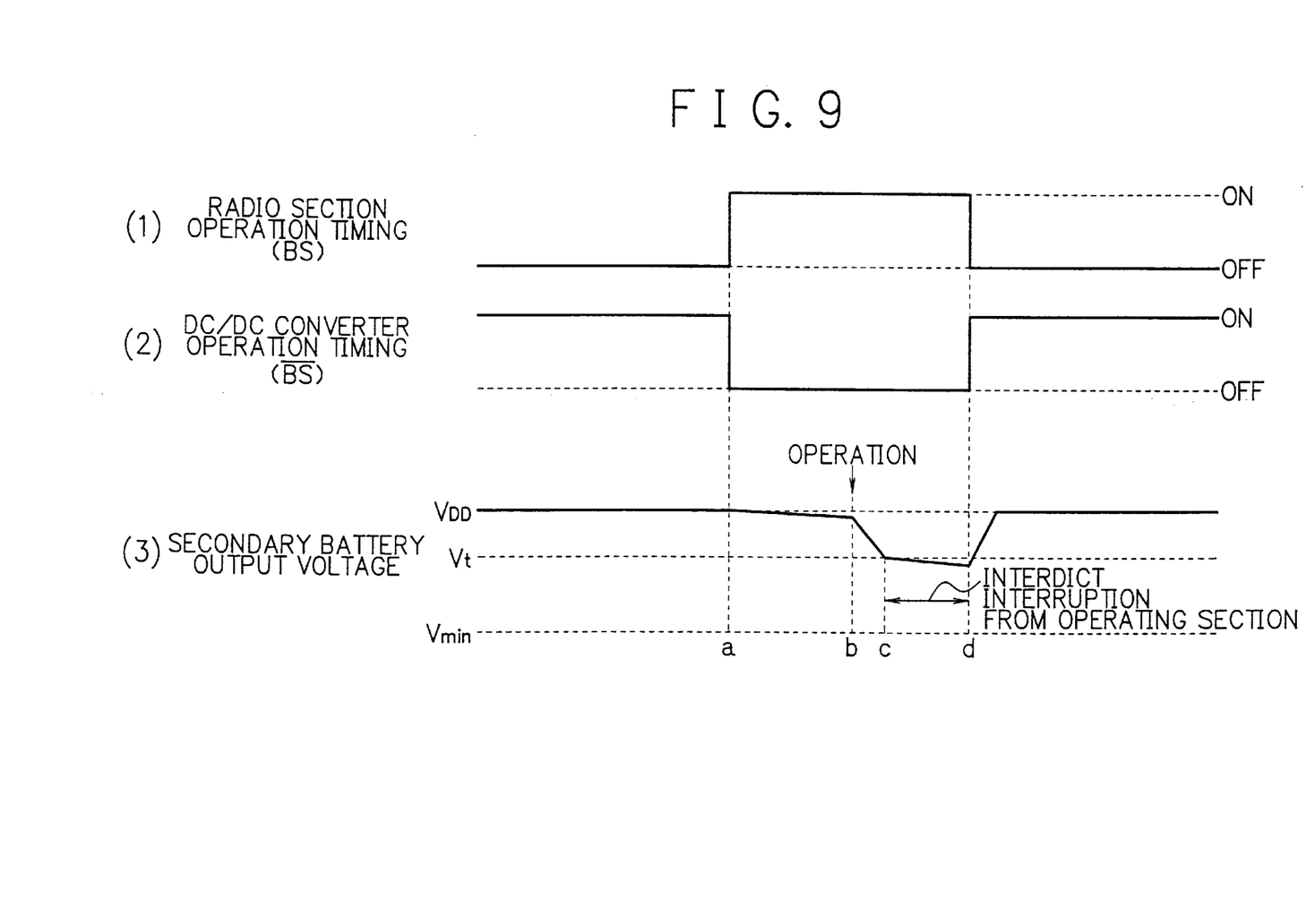
FIG. 9 is a timing chart showing the output voltage change of a secondary battery at the time of interruption from an operating section of an embodiment of the radio selective-calling receiver of the present invention.

Next, the operation of a radio selective-calling receiver applying POCSAG signal format is explained. FIG. 7 is a flow chart showing the operation of the controller 2 and the low voltage detecting circuit 7 of this radio selective-calling receiver. FIG. 8 is a timing chart showing the operation timing of the POCSAG signal format which is constituted of a preamble and plural batches and this one batch is composed of a synchronization code SC and eight frames, and also showing the operation timing of the radio section 1 for this POCSAG signal format and the DC/DC converter 3. FIG. 9 is a timing chart showing the output voltage changes of the secondary battery 4 expanded the "A" part of FIG. 8.

Generally, the controller 2 of the radio selective-calling receiver always operates to take timing and detects the preamble showing in FIG. 8(a), this preamble is a repeat of "1" and "0". After detecting this preamble, the detecting operation of the synchronization code SC is implemented. After detected the synchronization code SC, the controller 2 decides by which number of frame the radio section 2 is switched on according to the ID which this radio selective-calling receiver has, in this example, the radio section 1 is switched on at the third frame. On and after the second batch, the synchronization code SC is not received and the radio section 1 is switched on by said third frame. As mentioned above, the radio section 1 of the radio selective-calling receiver implements intermittent operation to extend the battery life, the period of "on" state of the radio section 1 is shorter than that of "off" state.

In this embodiment of the radio selective-calling receiver, the on/off control of the DC/DC converter 3 is implemented by a battery saving operation timing control signal BS of the radio section 1. As shown in FIG. 8(c), the operation timing of the DC/DC converter 3 is the inverted one of the operation timing of the radio section 1 showing in FIG. 8(b), at the time of "off" of the radio section 1, the DC/DC converter 3 becomes "on". Utilizing the period of "off" of the radio section 1, the secondary battery 4 is charged by the DC/DC converter 3, therefore the charging time becomes longer and it is possible to keep the almost fully charged state and it makes the sufficient power supply to the controller 2 possible, and even at the case that the output voltage of the secondary battery 4 is decreased, it is possible to charge the secondary battery 4 more rapidly than the conventional one.

Next, using FIGS. 7 and 9, the controller 2 including the operation of the low voltage detecting circuit 7 is explained in detail. In FIG. 7, as mentioned above, utilizing the period of "off" of the radio section 1, the secondary battery 4 is charged by the DC/DC converter 3, therefore the secondary battery 4 is at the fully charged state and from this state the operation starts. The operation timing of the DC/DC converter 3 is the inverted one of the operation timing of the radio section 1, therefore at the time of the radio section 1 becomes "on", the DC/DC converter 3 becomes "off" (step S1 and S2). Because of that the DC/DC converter 3 becomes "off", by the consumption current of the controller 2, the output voltage of the secondary battery 4 is gradually decreased. This corresponds to the output voltage change of the secondary battery 4 between points "a" and "b" in FIG. 9 (3).

The low voltage detecting circuit 7 always watches the output voltage of the secondary battery 4, therefore at the time of the output voltage of the secondary battery 4 decreases and becomes below the fixed voltage value Vt, the low voltage detecting circuit 7 detects this (step S3), and the interruption from the operating section 6 to the controller 2 is interdicted (step S4). Usually, Vmin is 2.0 volt and to make Vt>Vmin, for example Vt is set as 2.2 volt. For example, as shown in FIG. 9 (3), by the result of a user implements the operation of this radio selective-calling receiver at the point "b", the consumption current of the controller 2 increases rapidly, and the output voltage of the secondary battery 4 decreases rapidly and at the point "c" becomes below said voltage value Vt, the low voltage detecting circuit 7 interdicts the interruption from the operating section 6 to the controller 2. With this operation, the rapid current increase of the controller 2 is restrained, as shown at the points between "c" and "d" in FIG. 9 (3), the output voltage of the secondary battery 4 decreases gradually. As a result, the output voltage of the secondary battery 4 does not become below the minimum operating voltage Vmin of the controller 2.

At the point "d" in FIG. 9, at the time of the radio section 1 becomes "off", the DC/DC converter 3 becomes "on" (step S5), and the secondary battery 4 is charged and the output voltage increases to the power supply voltage $V_{DD}$. At the time when the DC/DC converter 3 becomes "on", the interdiction of the interruption from the operating section 6 to the controller 2 is canceled (step S5). After these operation, the operation from step S1 to S5 is repeated.

As mentioned above, in this embodiment, at the case that the radio section 1 is "on", the DC/DC converter 3 is stopped and the power supply to the controller 2 is implemented from the secondary battery 4, therefore the switching noise of the DC/DC converter 3 does not influence the radio section 1 and it is possible to get rid of the influence of the switching noise of the DC/DC converter 3. And the low voltage detecting circuit 7 which always watches and detects the output voltage of the secondary battery 4 is provided, at the case that the consumption current of the controller 2 is increased and the output voltage of the secondary battery 4 is decreased by the operation of a user, the interruption from the operating section 6 to the controller 2 by the low voltage detecting circuit 7 is interdicted, therefore the increase of current, that is the rapid decrease of the output voltage of the secondary battery 4 is possible to be prevented and the unstable operation of the controller 2 caused by the decrease of the supplied voltage does not occur and it is possible to keep the stable operation.

As the control signal of the DC/DC converter 3, the battery saving operation timing control signal BS of the radio section 1 is used in common, therefore the control signal SW only for the DC/DC converter 3 needed before is not needed and the construction that does not depend on the POCSAG signal format is possible.

For the operation timing of the DC/DC converter 3, as shown in FIG. 8(c), utilizing the period the radio section 1 is "off", the DC/DC converter 3 is operated and the secondary battery 4 is charged, therefore the charging time becomes longer and the almost full charged state is always able to be kept and it makes the sufficient power supply to the controller 2 possible, and even at the case that the output voltage of the secondary battery 4 decreases, it is possible to charge the secondary battery 4 more rapidly than before.

Figure 10:
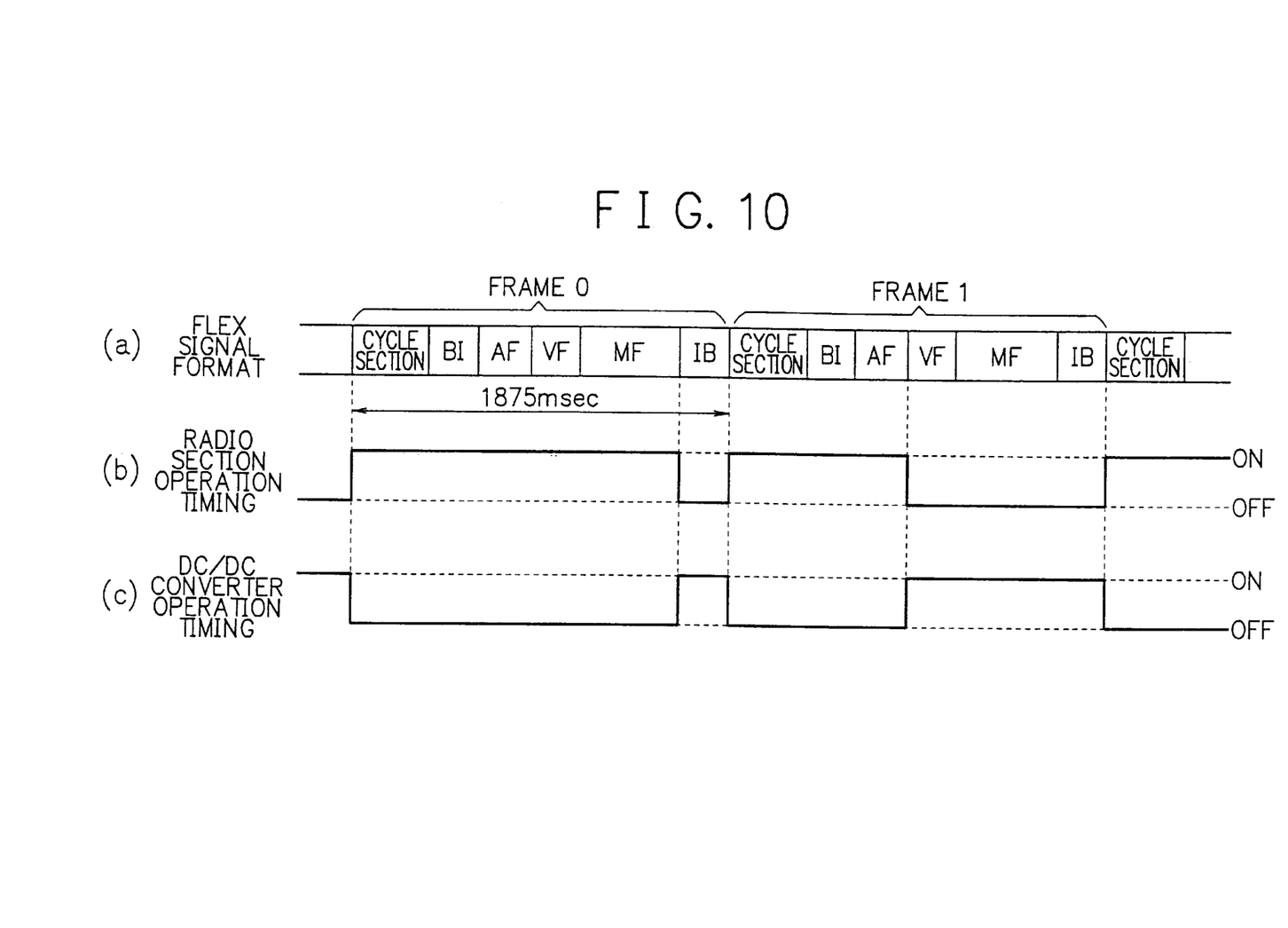
FIG. 10 is the FLEX signal format and a timing chart showing the operation timing of a radio section and a DC/DC converter for this FLEX signal format of an embodiment of the present invention.

In the, above mentioned embodiment, the radio selective-calling receiver applied the POCSAG signal format is explained as an example, for other signal formats except the POCSAG signal format, for example the FLEX format, the present invention is applicable. In FIG. 10(a), the FLEX signal format is shown. In this, FLEX is a registered trade mark.

As shown in FIG. 10, the radio section 1 becomes "on" anticipating the synchronization timing by a built-in time r. In this, the explanation is implemented based on the state that the radio section 1 becomes "on" at each frame. In block information BI, there is the information of frame and format construction, that is, there is the information of positions of an address field AF and a vector field VF and so forth. In the address field AF, there are the information of ID address and so forth, at the case that the ID of a user is detected, the next vector field VF is read, and the type of message such as numbers and English letters and the information of position of the message are detected, and the message data in a message field MF are read. After this, the radio section 1 becomes "off", this corresponds to the part of the frame 0 (zero). In the address field AF, at the case that the ID of the user is not detected, the radio section 1 becomes "off" and this corresponds to the part of the frame 1.

As shown in FIG. 10(c), the operation timing of the DC/DC converter 3 is set as the inverted one of the operation timing of the radio section 1 shown in FIG. 10(b), even the signal format is different, the same effect as the radio selective-calling receiver applied the above mentioned POCSAG format is obtained.

As explained above, the construction of the present invention is that at the time of non-operation of the radio section 1, the DC/DC converter 3 is turned "on" by the operation timing control signal from the controller 2 and the power of the primary battery 5 is converted from DC to DC, the power converted from DC to DC is supplied to the controller 2 and the secondary battery 4 is charged. Therefore, the sufficient charging to the secondary battery 4 during the non-operation period of the radio section 1 which is longer than the operation period based on the operation timing control signal is implemented, the sufficient energy is always able to be stored to the secondary battery 4, and it is possible to charge the secondary battery 4 rapidly and the sufficient power is able to be supplied to the controller 2.

The construction of the present invention is that the operation/non-operation of the DC/DC converter 3 is controlled by the signal based on the inverted control signal of the operation timing control signal of the radio section 1.

Therefore the control signal only to control the operation/non-operation of the DC/DC converter 3 needed before is not needed, it is possible to charge the secondary battery 4 sufficiently without depending on the signal format, and it makes that the sufficient energy is always stored to the secondary battery 4 possible, and the rapid charge of the secondary battery 4 is also able to be implemented and the sufficient power supply to the controller 2 is possible.

According to the present invention, the output voltage of the secondary battery 4 is detected and at the time when the output voltage of the secondary battery 4 detected becomes below a fixed voltage value, the interruption from the operating section 6 to the controller 2 is interdicted. Therefore, even at the case that the consumption current of the controller 2 is increased by the operation input of a user, by interdicting the interruption, the controller 2 is able to keep the output voltage of the secondary battery 4 at a fixed voltage value being operational and stable, and the stable operation of the controller 2 is obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A radio selective-calling receiver, comprising:
    a radio section which receives radio signals from the outside by intermittent operation and demodulates the radio signals;
    a primary battery supplying power to said radio section;
    a controller which decodes said demodulated signals at said radio section and also generates operation timing control signals to make said radio section operate intermittently and outputs said signals to said radio section;
    a secondary battery supplying power to said controller;
    a DC/DC converter which is controlled to operation/non-operation control by said operation timing control signals from said controller and converts the power of said primary battery from DC to DC and supplies said power to said controller and said secondary battery at the time of the non-operation of said radio section;
    an operating section which sends an interruption signal to said controller based on operation input signals when a user operates the radio selective-calling receiver which results in an increased electrical consumption current from, and a more rapid decrease in the output voltage of, the secondary battery;
    a low voltage detecting circuit which detects the output voltage of said secondary battery and outputs an interdiction signal to said controller when the detected output voltage of said secondary battery drops below a fixed threshold voltage Vt, which interdiction signal prevents an interruption by the operating section to prevent the increased electrical consumption current from, and more rapid decrease in the output voltage of, the secondary battery, to prevent the output voltage of the secondary battery from dropping below a minimum operating voltage Vmin of the controller to maintain stable operation of the controller.

2. A radio selective-calling receiver in accordance with claim 1, wherein:
    said DC/DC converter is controlled to the operation/non-operation control by inverted control signals inverted from the operation timing control signals from said controller.

3. A radio selective-calling receiver in accordance with claim 1, wherein:
    said low voltage detecting circuit cancels the interdiction of the interruption to said controller at the time when said DC/DC converter operates.

4. A radio selective-calling receiver in accordance with claim 1, wherein:
    said low voltage detecting circuit cancels the interdiction of the interruption to said controller at the time when said DC/DC converter operates.

5. A radio selective-calling receiver in accordance with claim 1, wherein:
    said operation timing control signals to said radio section include control signals corresponding to the POCSAG signals which said controller outputs to said radio section to implement that said radio section receives the POCSAG format signals.

6. A radio selective-calling receiver in accordance with claim 1, wherein:
    said operation timing control signals to said radio section include control signals corresponding to the FLEX signals which said controller outputs to said radio section to implement that said radio section receives the FLEX format signals.

* * * * *

UNITED STATES PATENT AND TRADEMARK OFFICE
CERTIFICATE OF CORRECTION

PATENT NO.    : 6,223,025 B1
DATED         : April 24, 2001
INVENTOR(S)   : N. Tsukuda et al.

Page 1 of 1

It is certified that error appears in the above-identified patent and that said Letters Patent is hereby corrected as shown below:

<u>Title page,</u>
Item [56], References Cited, FOREIGN PATENT DOCUMENTS, insert:
-- 2 269 467 A   2/09/94   U.K. --

Signed and Sealed this

Twenty-sixth Day of March, 2002

Attest:

JAMES E. ROGAN
*Attesting Officer*       *Director of the United States Patent and Trademark Office*